(12) United States Patent
Bailey et al.

(10) Patent No.: US 11,076,129 B2
(45) Date of Patent: *Jul. 27, 2021

(54) MOCA ENTRY DEVICE (71) Applicant: PPC Broadband, Inc., East Syracuse, NY (US)

(72) Inventors: Paul Bailey, Camillus, NY (US); Yan Li, Syracuse, NY (US); Chad Wells, Centennial, CO (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/782,467

(22) Filed: Feb. 5, 2020

(65) Prior Publication Data

US 2020/0177839 A1 Jun. 4, 2020

Related U.S. Application Data

(63) Continuation of application No. 16/176,229, filed on Oct. 31, 2018, now Pat. No. 10,582,160, which is a (Continued)

(51) Int. Cl.
*H04N 7/173* (2011.01)
*H04N 7/10* (2006.01)
(Continued)

(52) U.S. Cl.
CPC ........ *H04N 7/17309* (2013.01); *H04H 20/63* (2013.01); *H04H 20/78* (2013.01);
(Continued)

(58) Field of Classification Search
CPC .. H04N 7/17309; H04N 7/10; H04N 21/6118; H04N 21/6168; H04H 20/63; H04H 20/78; H04H 20/79; H04L 12/2801
(Continued)

(56) References Cited

U.S. PATENT DOCUMENTS 2,662,217 A 12/1953 Roberts
3,790,909 A 2/1974 LeFevre
(Continued)

FOREIGN PATENT DOCUMENTS

CN 200941620 Y 8/2007
CN 201048432 Y 4/2008
(Continued)

OTHER PUBLICATIONS

Author Unknown, Office Action dated Jul. 31, 2014, Chinese Application No. 201110037086.1, filed Jan. 21, 2011, pp. 1-6.
(Continued)

*Primary Examiner* — Dominic D Saltarelli
(74) *Attorney, Agent, or Firm* — MH2 Technology Law Group LLP (57) ABSTRACT

An entry device includes an entry port, a filter connected to the entry port, a plurality of first output ports, and a plurality of second output ports. A first path extends from the entry port, through the filter, to the first output ports. The first path is configured to pass cable television (CATV) signals therethrough and to prevent at least a portion of multimedia over coax alliance (MoCA) signals from passing therethrough. A second path extends from the entry port, through the filter, to the second output ports. The second path is configured to prevent at least a portion of the CATV signals and at least a portion of the MoCA signals from passing therethrough. A third path extends from the first output ports, through the filter, to the second output ports. The third path is configured to pass the MoCA signals therethrough and to prevent at least a portion of the CATV signals from passing therethrough.

53 Claims, 5 Drawing Sheets

Related U.S. Application Data continuation of application No. 15/638,933, filed on Jun. 30, 2017, now Pat. No. 10,212,392.

(60) Provisional application No. 62/356,937, filed on Jun. 30, 2016.

(51) Int. Cl.
*H04N 21/61* (2011.01)
*H04H 20/63* (2008.01)
*H04H 20/78* (2008.01)
*H04H 20/79* (2008.01)
*H04L 12/28* (2006.01)

(52) U.S. Cl.
CPC ........... *H04L 12/2801* (2013.01); *H04N 7/10* (2013.01); *H04H 20/79* (2013.01); *H04N 21/6118* (2013.01); *H04N 21/6168* (2013.01)

(58) Field of Classification Search
USPC ....................................................... 725/106
See application file for complete search history.

(56) References Cited

U.S. PATENT DOCUMENTS

| | | | |
|---|---|---|---|
| 3,939,431 A | 2/1976 | Cohlman | |
| 4,027,219 A | 5/1977 | Van Alphen et al. | |
| 4,306,403 A | 12/1981 | Hubbard et al. | |
| 4,344,499 A | 8/1982 | Van der Lely et al. | |
| 4,512,033 A | 4/1985 | Schrock | |
| 4,520,508 A | 5/1985 | Reichert, Jr. | |
| 4,648,123 A | 3/1987 | Schrock | |
| 4,677,390 A | 6/1987 | Wagner | |
| 4,715,012 A | 12/1987 | Mueller, Jr. | |
| 4,961,218 A | 10/1990 | Kiko | |
| 4,982,440 A | 1/1991 | Dufresne et al. | |
| 5,010,399 A | 4/1991 | Goodman et al. | |
| 5,126,686 A | 6/1992 | Tam | |
| 5,126,840 A | 6/1992 | Dufresne et al. | |
| 5,214,505 A | 5/1993 | Rabowsky et al. | |
| 5,231,660 A | 7/1993 | West, Jr. | |
| 5,245,300 A | 9/1993 | Sasaki et al. | |
| 5,369,642 A | 11/1994 | Shioka et al. | |
| 5,485,630 A | 1/1996 | Lee et al. | |
| 5,548,255 A | 8/1996 | Spielman | |
| 5,557,319 A | 9/1996 | Gurusami et al. | |
| 5,557,510 A | 9/1996 | McIntyre et al. | |
| 5,604,528 A | 2/1997 | Edwards et al. | |
| 5,719,792 A | 2/1998 | Bush | |
| 5,740,044 A | 4/1998 | Ehrenhardt et al. | |
| 5,745,836 A | 4/1998 | Williams | |
| 5,745,838 A | 4/1998 | Tresness et al. | |
| 5,815,794 A | 9/1998 | Williams | |
| 5,839,052 A | 11/1998 | Dean et al. | |
| 5,893,024 A | 4/1999 | Sanders et al. | |
| 5,937,330 A | 8/1999 | Vince et al. | |
| 5,950,111 A | 9/1999 | Georger et al. | |
| 5,970,053 A | 10/1999 | Schick et al. | |
| 6,012,271 A | 1/2000 | Wilkens et al. | |
| 6,014,547 A | 1/2000 | Caporizzo et al. | |
| 6,049,693 A | 4/2000 | Baran et al. | |
| 6,069,960 A | 5/2000 | Mizukami et al. | |
| 6,094,211 A | 7/2000 | Baran et al. | |
| 6,101,932 A | 8/2000 | Wilkens | |
| 6,128,040 A | 10/2000 | Shinbori et al. | |
| 6,129,187 A | 10/2000 | Bellanger et al. | |
| 6,173,225 B1 | 1/2001 | Stelzle et al. | |
| 6,185,432 B1 | 2/2001 | Vembu | |
| 6,205,138 B1 | 3/2001 | Nihal et al. | |
| 6,229,375 B1 | 5/2001 | Koen | |
| 6,348,837 B1 | 2/2002 | Ibelings | |
| 6,348,955 B1 | 2/2002 | Tait | |
| 6,373,349 B2 | 4/2002 | Gilbert | |
| 6,377,316 B1 | 4/2002 | Mycynek et al. | |
| 6,388,539 B1 | 5/2002 | Rice | |
| 6,425,132 B1 | 7/2002 | Chappell | |
| 6,430,904 B1 | 8/2002 | Coers et al. | |
| 6,495,998 B1 | 12/2002 | Terreault | |
| 6,498,925 B1 | 12/2002 | Tauchi | |
| 6,510,152 B1 | 1/2003 | Gerszberg et al. | |
| 6,546,705 B2 | 4/2003 | Scarlett et al. | |
| 6,550,063 B1 | 4/2003 | Matsuuara | |
| 6,560,778 B1 | 5/2003 | Hasegawa | |
| 6,570,928 B1 | 5/2003 | Shibata | |
| 6,587,012 B1 | 7/2003 | Farmer et al. | |
| 6,622,304 B1 | 9/2003 | Carhart | |
| 6,640,338 B1 | 10/2003 | Shibata | |
| 6,678,893 B1 | 1/2004 | Jung | |
| 6,683,513 B2 | 1/2004 | Shamsaifar et al. | |
| 6,725,462 B1 | 4/2004 | Kaplan | |
| 6,728,968 B1 | 4/2004 | Abe et al. | |
| 6,737,935 B1 | 5/2004 | Shafer | |
| 6,757,910 B1 | 6/2004 | Bianu | |
| 6,758,292 B2 | 7/2004 | Shoemaker | |
| 6,804,828 B1 | 10/2004 | Shibata | |
| 6,843,044 B2 | 1/2005 | Clauss | |
| 6,845,232 B2 | 1/2005 | Darabi | |
| 6,920,614 B1 | 1/2005 | Schindler et al. | |
| 6,868,552 B1 | 3/2005 | Masuda et al. | |
| 6,877,166 B1 | 4/2005 | Roeck et al. | |
| 6,915,530 B1 | 7/2005 | Kauffman et al. | |
| 6,928,175 B1 | 8/2005 | Bader et al. | |
| 6,942,595 B2 | 9/2005 | Hrazdera | |
| 7,003,275 B1 | 2/2006 | Petrovic | |
| 7,029,293 B2 | 4/2006 | Shapson et al. | |
| 7,039,432 B2 | 5/2006 | Strater et al. | |
| 7,048,106 B2 | 5/2006 | Hou | |
| 7,127,734 B2 | 10/2006 | Amit | |
| 7,162,731 B2 | 1/2007 | Reidhead et al. | |
| 7,254,827 B1 | 8/2007 | Terreault | |
| 7,283,479 B2 | 10/2007 | Ljungdahl et al. | |
| 7,399,255 B1 | 7/2008 | Johnson et al. | |
| 7,404,355 B2 | 7/2008 | Viaud et al. | |
| 7,416,068 B2 | 8/2008 | Ray et al. | |
| 7,454,252 B2 | 11/2008 | El-Sayed | |
| 7,464,526 B2 | 12/2008 | Coenen | |
| 7,505,819 B2 | 3/2009 | El-Sayed | |
| 7,508,284 B2 | 3/2009 | Shafer | |
| 7,530,091 B2 | 5/2009 | Vaughan | |
| 7,592,883 B2 | 9/2009 | Shafer | |
| 7,675,381 B2 | 6/2010 | Lin | |
| 7,742,777 B2 | 6/2010 | Strater et al. | |
| 7,783,195 B2 | 8/2010 | Riggsby | |
| 8,179,814 B2 | 5/2012 | Shafer et al. | |
| 8,286,209 B2 | 10/2012 | Egan et al. | |
| 8,356,322 B2 * | 1/2013 | Wells | H04N 21/615 725/78 |
| 8,429,695 B2 | 4/2013 | Halik | |
| 8,510,782 B2 | 8/2013 | Wells | |
| 8,752,114 B1 | 6/2014 | Shapson et al. | |
| 9,167,286 B2 | 10/2015 | Wells et al. | |
| 9,351,051 B2 | 5/2016 | Wells et al. | |
| 9,516,376 B2 | 12/2016 | Wells et al. | |
| 9,781,472 B2 | 10/2017 | Wells et al. | |
| 9,860,591 B2 | 1/2018 | Wells et al. | |
| 2001/0016950 A1 | 8/2001 | Matsuura | |
| 2002/0069417 A1 | 6/2002 | Kliger | |
| 2002/0141347 A1 | 10/2002 | Harp et al. | |
| 2002/0144292 A1 | 10/2002 | Uemura et al. | |
| 2002/0166124 A1 | 11/2002 | Gurantz et al. | |
| 2002/0174423 A1 | 11/2002 | Fifield et al. | |
| 2003/0005450 A1 | 1/2003 | Smith | |
| 2003/0084458 A1 | 5/2003 | Ljungdahl et al. | |
| 2004/0147273 A1 | 7/2004 | Morphy | |
| 2004/0172659 A1 | 9/2004 | Ljungdahl et al. | |
| 2004/0229561 A1 | 11/2004 | Cowley et al. | |
| 2005/0034168 A1 | 2/2005 | Beveridge | |
| 2005/0047051 A1 | 3/2005 | Marland | |
| 2005/0144649 A1 | 6/2005 | Bertonis | |
| 2005/0183130 A1 | 8/2005 | Sadja et al. | |
| 2005/0210977 A1 | 9/2005 | Yan | |
| 2005/0283815 A1 | 12/2005 | Brooks et al. | |
| 2005/0289632 A1 | 12/2005 | Brooks et al. | |

(56) References Cited

U.S. PATENT DOCUMENTS

| | | |
|---|---|---|
| 2006/0015921 A1 | 1/2006 | Vaughan |
| 2006/0041918 A9 | 2/2006 | Currivan et al. |
| 2006/0117371 A1 | 6/2006 | Margulis |
| 2006/0191359 A1 | 8/2006 | Tarasinski et al. |
| 2006/0205442 A1 | 9/2006 | Phillips et al. |
| 2006/0241838 A1 | 10/2006 | Mongiardo et al. |
| 2006/0282871 A1 | 12/2006 | Yo |
| 2007/0024393 A1 | 2/2007 | Forse et al. |
| 2007/0288981 A1 | 12/2007 | Mitsuse et al. |
| 2007/0288982 A1 | 12/2007 | Donahue |
| 2008/0001645 A1 | 1/2008 | Kuroki |
| 2008/0013612 A1 | 1/2008 | Miller et al. |
| 2008/0022344 A1 | 1/2008 | Riggsby |
| 2008/0040764 A1 | 2/2008 | Weinstein et al. |
| 2008/0120667 A1 | 5/2008 | Zaltsman |
| 2008/0127287 A1 | 5/2008 | Alkan et al. |
| 2008/0157898 A1 | 7/2008 | Palinkas et al. |
| 2008/0168518 A1 | 7/2008 | Hsue et al. |
| 2008/0225902 A1 | 9/2008 | Chung |
| 2008/0247401 A1 | 10/2008 | Bhal et al. |
| 2008/0247541 A1 | 10/2008 | Cholas et al. |
| 2008/0271094 A1 | 10/2008 | Kliger et al. |
| 2008/0313691 A1 | 12/2008 | Cholas et al. |
| 2009/0031391 A1 | 1/2009 | Urbanek |
| 2009/0047919 A1 | 2/2009 | Phillips et al. |
| 2009/0077608 A1 | 3/2009 | Romerein et al. |
| 2009/0153263 A1 | 6/2009 | Lin |
| 2009/0165070 A1 | 6/2009 | McMullin et al. |
| 2009/0180782 A1 | 7/2009 | Bernard et al. |
| 2009/0217325 A1 | 8/2009 | Kliger et al. |
| 2009/0320086 A1 | 12/2009 | Rijssemus et al. |
| 2010/0017842 A1 | 1/2010 | Wells |
| 2010/0095344 A1 | 4/2010 | Newby |
| 2010/0100918 A1 | 4/2010 | Egan |
| 2010/0125877 A1 | 5/2010 | Wells |
| 2010/0146564 A1 | 6/2010 | Halik |
| 2010/0162340 A1 | 6/2010 | Riggsby |
| 2010/0194489 A1 | 8/2010 | Kearns et al. |
| 2010/0225813 A1 | 9/2010 | Hirono et al. |
| 2011/0002245 A1 | 1/2011 | Wall et al. |
| 2011/0010749 A1 | 1/2011 | Alkan |
| 2011/0051014 A1 | 3/2011 | Wang et al. |
| 2011/0069740 A1 | 3/2011 | Cowley et al. |
| 2011/0072472 A1 | 3/2011 | Wells |
| 2011/0181371 A1 | 7/2011 | Alkan |
| 2011/0258677 A1 | 10/2011 | Shafer |
| 2012/0054805 A1 | 3/2012 | Shafer |
| 2012/0054819 A1 | 3/2012 | Alkan |
| 2012/0081190 A1 | 4/2012 | Rijssemus |
| 2012/0159556 A1 | 6/2012 | Alkan |
| 2012/0331501 A1 | 12/2012 | Shafer |
| 2013/0081096 A1 | 3/2013 | Wells et al. |
| 2013/0291029 A1 | 6/2013 | Wells et al. |
| 2013/0181789 A1 | 7/2013 | Rijssemus |
| 2013/0227632 A1 | 8/2013 | Wells et al. |
| 2013/0283334 A1 | 10/2013 | Tsao et al. |

FOREIGN PATENT DOCUMENTS

| | | |
|---|---|---|
| JP | 55-080989 A | 6/1980 |
| JP | 55-132126 A | 10/1980 |
| JP | 58-99913 | 12/1981 |
| JP | 57-091055 A | 6/1982 |
| JP | 58-101582 A | 6/1983 |
| JP | 59026709 | 8/1984 |
| JP | 61-157035 A | 7/1986 |
| JP | 05-191416 A | 7/1993 |
| JP | 07-038580 A | 2/1995 |
| JP | 11-069334 A | 3/1999 |
| JP | 2001-177580 A | 6/2001 |
| JP | 2004-080483 | 3/2004 |
| JP | 2005-005875 | 1/2005 |
| JP | 2007-166109 A | 6/2007 |
| JP | 2007-166110 A | 6/2007 |
| WO | 0024124 A1 | 4/2000 |
| WO | 0172005 A1 | 9/2001 |
| WO | 0233969 A1 | 4/2002 |
| WO | 02091676 A1 | 11/2002 |

OTHER PUBLICATIONS

Sung Lark Kwon (Authorized Officer), International Search Report dated May 31, 2011, PCT Application No. PCT/US2010/049568, filed Sep. 21, 2010, pp. 1-3.

Wells, "Cable Television Entry Adapter", U.S. Appl. No. 13/245,510, filed Sep. 26, 2011.

Office Action Summary dated Mar. 6, 2012, U.S. Appl. No 12/563,719, filed Sep. 21, 2009, pp. 1-13.

Office Action Summary dated Jan. 23, 2012, U.S. Appl. No. 12/250,229, filed Oct. 13, 2008, pp. 1-25.

Office Action Summary dated Nov. 22, 2011, U.S. Appl. No. 12/255,008, filed Oct. 21, 2008, pp. 1-22.

Non-Final Office Action dated Feb. 26, 2016, U.S. Appl. No. 14/881,686, filed Oct. 13, 2015, pp. 1-6.

Wells et al., CATV Entry Adapter and Method for Distributing CATV and In-Home Entertainment Signals, U.S. Appl. No. 15/722,302, filed Oct. 2, 2017.

Wells et al., Passive Multi-Port Entry Adapter and Method for Preserving Downstream CATV Signal Strength Within In-Home Network, U.S. Appl. No. 15/880,166, filed Jan. 25, 2018.

Wells et al., Passive Multi-Port Entry Adapter and Method for Preserving Downstream CATV Signal Strength Within In-Home Network, U.S. Appl. No. 15/880,231, filed Jan. 25, 2018.

Wells et al., Passive Multi-Port Entry Adapter and Method for Preserving Downstream CATV Signal Strength Within In-Home Network, U.S. Appl. No. 15/880,363, filed Jan. 25, 2018.

Wells et al., Passive Multi-Port Entry Adapter and Method for Preserving Downstream CATV Signal Strength Within In-Home Network, U.S. Appl. No. 15/880,381, filed Jan. 25, 2018.

Wells et al., Passive Multi-Port Entry Adapter and Method for Preserving Downstream CATV Signal Strength Within In-Home Network, U.S. Appl. No. 15/880,400, filed Jan. 25, 2018.

Wells et al., CATV Entry Adapter and Method for Distributing CATV and In-Home Entertainment Signals, U.S. Appl. No. 15/890,573, filed Feb. 7, 2018.

Wells et al., CATV Entry Adapter and Method for Preventing Interference with EMTA Equipment from MOCA Signals, U.S. Appl. No. 15/891,441, filed Feb. 8, 2018.

Wells et al., Passive Multi-Port Entry Adapter and Method for Preserving Downstream CATV Signal Strength Within In-Home Network, U.S. Appl. No. 15/886,788, filed Feb. 1, 2018.

Wells et al., Passive Multi-Port Entry Adapter and Method for Preserving Downstream CATV Signal Strength Within In-Home Network, U.S. Appl. No. 15/886,800, filed Feb. 1, 2018.

Pre-Interview First Office Action dated Jul. 16, 2018, U.S. Appl. No. 15/880,166, filed Jan. 25, 2018, pp. 1-10.

Pre-Interview First Office Action dated Aug. 3, 2018, U.S. Appl. No. 15/880,363, filed Jan. 25, 2018, pp. 1-30.

First Action Interview Office Action dated Aug. 10, 2018, U.S. Appl. No. 15/890,573, filed Feb. 7, 2018, pp. 1-15.

First Action Interview Office Action dated Aug. 10, 2018, U.S. Appl. No. 15/891,441, filed Feb. 8, 2018, pp. 1-15.

Pre-Interview First Office Action dated Aug. 10, 2018, U.S. Appl. No. 15/886,788, filed Feb. 1, 2018, pp. 1-30.

Non-Final Office Action dated May 18, 2018, U.S. Appl. No. 15/722,302, filed Oct. 2, 2017, pp. 1-34.

Pre-Interview First Office Action dated Jun. 8, 2018, U.S. Appl. No. 15/890,573, filed Feb. 7, 2018, pp. 1-24.

Pre-Interview First Office Action dated Jun. 18, 2018, U.S. Appl. No. 15/891,441, filed Feb. 8, 2018, pp. 1-24.

Shane Thomas (Authorized Officer), International Search Report and Written Opinion dated Nov. 2, 2017, PCT Application No. PCT/US2017/040260, filed Jun. 30, 2017, pp. 1-18.

Mineko Mohri (Authorized Officer), International Preliminary Report on Patentability dated Jan. 10, 2019, PCT Application No. PCT/US2017/040260, filed Jun. 30, 2017, pp. 1-9.

(56) References Cited

OTHER PUBLICATIONS

Notice of Allowance dated May 8, 2019, U.S. Appl. No. 15/880,231, pp. 1-52.

* cited by examiner

MOCA ENTRY DEVICE

CROSS REFERENCE TO RELATED APPLICATIONS

This application is a continuation of U.S. patent application Ser. No. 16/176,229, filed on Oct. 31, 2018, which is a continuation of U.S. patent application Ser. No. 15/638,933, filed on Jun. 30, 2017, which claims priority to U.S. Provisional Patent Application No. 62/356,937, filed on Jun. 30, 2016. The content of each of these applications is incorporated herein.

FIELD

This invention generally relates to cable television (CATV) networks and to in-home entertainment networks. More particularly, the present invention relates to a Multimedia over Coax Alliance (MoCA) entry device.

BACKGROUND

CATV networks supply and distribute high frequency "downstream" signals from a main signal distribution facility, known as a "headend," to premises (e.g., homes and offices) of subscribers. The downstream signals can be provided to subscriber equipment, such as televisions, telephones, and computers. In addition, most CATV networks also receive "upstream" signals from subscriber equipment back to the headend of the CATV network. For example, a set top box can send an upstream signal including information for selecting programs for viewing on a television. Also, upstream and downstream signals are used by personal computers connected through the CATV infrastructure to the Internet. Further, voice over Internet protocol (VOIP) telephones use upstream and downstream signals to communicate telephone conversations.

To permit simultaneous communication of upstream and downstream CATV signals, and to permit interoperability of the subscriber equipment and the equipment associated with the CATV network infrastructure outside of subscriber premises, the downstream and upstream signals are confined to two different frequency bands. For example, in some CATV networks the downstream frequency band can be within the range of 54-1002 megahertz (MHz) and the upstream frequency band can be within the range of 5-42 MHz.

The downstream signals are delivered from the CATV network infrastructure to the subscriber premises at a CATV entry device, which is also commonly referred to as a network interface device, an entry adapter, a port adapter, or a drop amplifier. The entry device is a multi-port device that connects at an entry port to a CATV drop cable from the CATV network infrastructure and connects at a multiplicity of other input/output ports (hereinafter "ports") to coaxial cables that extend throughout the subscriber premises to cable outlets. Each cable outlet is available to be connected to subscriber equipment such as television sets, computers, and telephone sets. The multiple ports of the entry device deliver the downstream signals to each cable outlet and conduct the upstream signals from the subscriber equipment through the entry device to the drop cable of the CATV infrastructure.

In addition to television sets, computers and telephones, a large number of other entertainment and multimedia devices are available for use in homes. For example, a digital video recorder (DVR) can be used to record broadcast programming, still photography and movies in a memory medium so that the content can be replayed on a display or television set at a later time selected by the user. As another example, video games are also played on personal computers or on gaming systems connected to television sets. Such video games may be those that interface real time through the CATV network's internet service provider. As a further example, signals from a receiver of satellite-broadcast signals may be distributed for viewing or listening throughout the home. These types of devices, which can also include conventional television sets, telephone sets, and other such devices connected to the Internet by the CATV network, are generically referred to as "multimedia devices."

The desire to use multimedia devices at multiple different locations within the home or subscriber premises has led to the creation of MoCA. MoCA has developed specifications for products to create an in-home entertainment network for interconnecting multimedia devices. A MoCA in-home network uses the subscriber premise or in-home coaxial cable infrastructure originally established for distribution of CATV signals within the subscriber premises, principally because that coaxial cable infrastructure already exists in most homes and is capable of carrying much more information than is carried in the CATV frequency bands. A MoCA network is established by connecting MoCA-enabled or MoCA interface devices at the cable outlets in the rooms of the subscriber premises. These MoCA interface devices implement a MoCA communication protocol which encapsulates signals normally used by the multimedia devices within MoCA signal packets and then communicates the MoCA signal packets between other MoCA interface devices connected at other cable outlets. The receiving MoCA interface device removes the encapsulated multimedia signals from the MoCA signal packets, and delivers the multimedia signals to the connected display, computer, or other multimedia device from which the content is presented to the user.

Each MoCA-enabled device is capable of communicating with every other MoCA-enabled device in the subscriber premises to deliver the multimedia content. For example, the multimedia content that is available from one MoCA-enabled device can be displayed, played, or otherwise used on a different MoCA-enabled device at a different location within the subscriber premise, thereby avoiding physically relocating the originating multimedia device from one location to another within the subscriber premises. The communication of multimedia content over the MoCA network is beneficial because it more fully utilizes the multimedia devices present in modern homes.

In current entry devices for MOCA networks, the outputs on the downstream side communicate over the frequency range of 54 MHz to 1675 MHz. Accordingly, components of the MOCA entry device (e.g., filters and splitters) are configured to operate over this entire frequency range. However, doing so prevents the components from being optimized for any particular operating range, which reduces the performance (e.g., noise, power loss, and/or isolation) of the components while increasing their cost and/or complexity.

SUMMARY

Embodiments in accordance with the present disclosure provide an entry device. The entry device includes an entry port. The entry device also includes a low-band filter connected to the entry port and configured to pass the cable television (CATV) signals therethrough and to prevent at least a portion of multimedia over coax alliance (MoCA) signals from passing therethrough. The entry device also includes a high-band filter connected to the low-band filter and configured to pass the MoCA signals therethrough and to prevent at least a portion of the CATV signals from passing therethrough. The entry device also includes a broadband splitter connected to the low-band filter and the high-band filter. The entry device also includes a high-band splitter connected to the high-band filter. The entry device also includes a plurality of first output ports connected to the broadband splitter. The entry device also includes a plurality of second output ports connected to the high-band splitter. A first path extends from the entry port, through the low-band filter and the broadband splitter, to the first output ports. The first path is configured to pass the CATV signals therethrough and to prevent at least a portion of MoCA signals from passing therethrough. A second path extends from the entry port, through the low-band filter, the high-band filter, and the high-band splitter, to the second output ports. The second path is configured to prevent at least a portion of the CATV signals and at least a portion of the MoCA signals from passing therethrough. A third path extends from the first output ports, through the broadband splitter, the high-band filter, and the high-band splitter, to the second output ports. The third path is configured to pass the MoCA signals therethrough and to prevent at least a portion of the CATV signals from passing therethrough.

An another embodiment, the entry device includes an entry port, a filter connected to the entry port, a plurality of first output ports, and a plurality of second output ports. A first path extends from the entry port, through the filter, to the first output ports. The first path is configured to pass cable television (CATV) signals therethrough and to prevent at least a portion of multimedia over coax alliance (MoCA) signals from passing therethrough. A second path extends from the entry port, through the filter, to the second output ports. The second path is configured to prevent at least a portion of the CATV signals and at least a portion of the MoCA signals from passing therethrough. A third path extends from the first output ports, through the filter, to the second output ports. The third path is configured to pass the MoCA signals therethrough and to prevent at least a portion of the CATV signals from passing therethrough.

In yet another embodiment, the entry device includes an entry port, a filter connected to the entry port, a plurality of first output ports, and a plurality of second output ports. A first path extends from the entry port, through the filter, to the first output ports. The first path is configured to pass cable television (CATV) signals therethrough and to prevent at least a portion of multimedia over coax alliance (MoCA) signals from passing therethrough. A second path extends from the entry port, through the filter, to the second output ports. The second path is configured to prevent at least a portion of the CATV signals and at least a portion of the MoCA signals from passing therethrough. A third path extends from the first output ports to the second output ports. The third path is configured to pass the MoCA signals therethrough and to prevent at least a portion of the CATV signals from passing therethrough.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings.

DETAILED DESCRIPTION

The present disclosure is directed to a passive MoCA entry device that splits signals into two paths and distributes the signals to broadband devices (e.g., CATV devices such as VOIPs, embedded multimedia port adapters ("eMTAs"), cable modem/gateways, and/or master DVR devices) in a broadband path, and high-band devices (e.g., multimedia devices) in a high-band path. In accordance with aspects of the present disclosure, components (e.g., resistors, capacitors, and inductors) used in circuits within the broadband path and the high-band path are optimized to transfer the frequencies of signals respectively carried by the paths. The optimization of the circuits tuned to the broadband path and the high-band path using high-precision components having physical configurations (size, core, and/or coils) that minimize loss (dB) in the operating frequency ranges of the paths, maximizes loss (dB) outside the operating frequency ranges of the paths, and minimizes reflections and/or sideband interference of the signals. By doing so, the circuits included each the broadband path and the high-band path can be simplified to reduce the cost of the MoCA entry device, as well as that of the multimedia devices in a subscriber premises.

Additionally, some embodiments of the MoCA entry device disclosed herein minimize a number of ports for the broadband devices. For example, the MoCA entry device may only include one broadband port, and some other embodiments may include only two broadband ports. As splitting of the broadband signal among a number of broadband ports is avoided, the MoCA entry device minimizes degradation (e.g., power loss) of the broadband signal. Thus, MoCA entry device disclosed herein is optimal for architectures that use a single modem/gateway device (e.g., a CATV set-top box) capable of communicating with both broadband devices in the CATV band (e.g., 5-1002 MHz) and high-band devices the MoCA frequency band (e.g., 1125-1675 MHz). Such modem/gateway device permits information that is transmitted by a service provider (e.g., a CATV system) to be shared amongst device in a MoCA network of a subscriber by permitting information included in the source signal (e.g., the CATV band) to be rebroadcast within the MoCA network.

Figure 1:
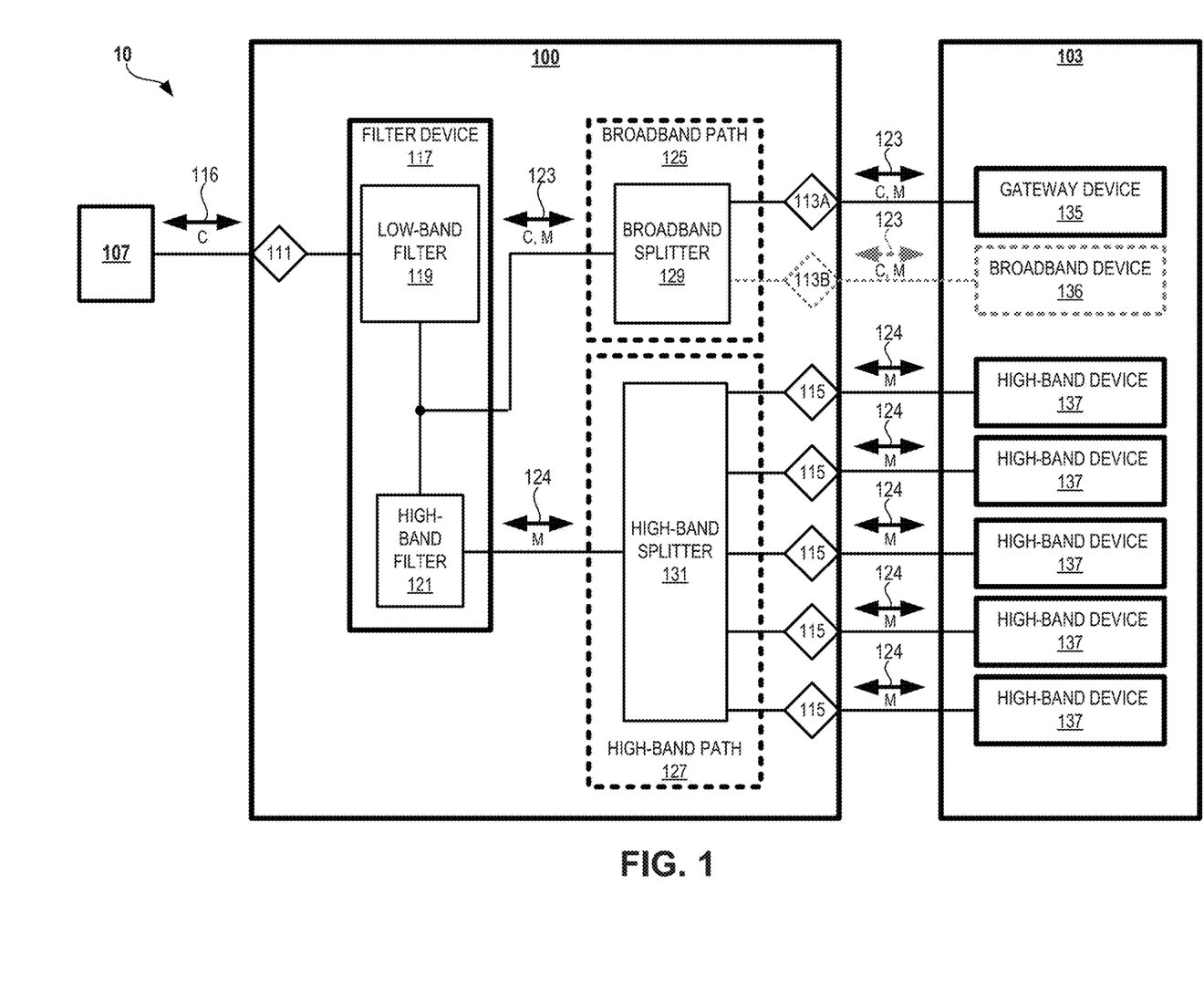
FIG. 1 shows a block diagram illustrating an example of an environment for a MoCA entry device in accordance with aspects of the present disclosure.

FIG. 1 shows a block diagram illustrating an example environment 10 in accordance with aspects of the present disclosure. The environment 10 includes a MoCA entry device 100, a premises 103, and a headend 107. The MoCA entry device 100 can be installed between the premises 103 (e.g., a home or business of a CATV subscriber) and a cable (e.g., COAX cable) connecting the headend 107 (e.g., an infrastructure of a CATV service that provides high-definition multimedia content and broadband Internet service). The MoCA entry device 100 includes an entry port 111, one or more broadband ports 113A and 113B (e.g., CATV ports), and a multiplicity of high-band ports 115 (e.g., MoCA ports), a filter device 117, a broadband path 125, and a high-band path 127.

The entry port 111 can connect to the headend 107 from which it receives/transmits a source signal 116 having a CATV frequency band (C). In embodiments, the CATV frequency band (C) can have a range between about 5 MHz to about 1002 MHz (e.g., a CATV signal). For example, the headend can be part of the infrastructure of a CATV service provider and the entry port 111 can connect to a drop cable of the CATV service provider. While FIG. 1 illustrates a signal entry port, it is understood that the MoCA entry device 100 can include two or more entry ports 111 which receive respective source signals 116 that are combined by a splitter/combiner device and provided to the filter device 117.

The filter device 117 connects the entry port 111 to the broadband path 125 and the high-band path 127. In accordance with aspects of the present disclosure, the filter device 117 receives the source signal 116 from the entry port 111 and passes it to the broadband path 125, while blocking the source signal 116 from the high-band path 127. In some embodiments, the filter device 117 is a diplexer having a low-band filter 119 and a high-band filter 121. The low-band filter 119 can be configured to bidirectionally pass the CATV frequency band (C) of the source signal 116 between the entry port 111 and the broadband path 125 and reject any frequencies greater than the CATV frequency band (C). For example, the low-band filter 119 can reject frequencies greater than about 1000 MHz (e.g., above the CATV band). Additionally, the high-band filter 121 of the filter device 117 can be a high-pass filter configured to reject all frequencies less than about 1125 MHz (e.g., frequencies below the MoCA band), which includes the CATV frequency band (C) of the source signal 116. In some embodiments, the high-band filter 121 can be a band-pass filter that rejects frequencies of the CATV signal 116 outside range of about 1125 MHz to about 1675 MHz. As such, the high-band filter 121 blocks communication of the source signal 116 from the filter device 117 to the high-band path 127.

The broadband path 125 and the high-band path 127 are physical, conductive (e.g., wired) signal paths. In accordance with aspects of the present disclosure, the broadband path 125 connects between the filter device 117 and the broadband ports 113A and/or 113B, and bidirectionally communicates broadband signal 123 to/from a gateway device 135 (e.g., a CATV gateway devices, such as a set-top box) and/or a broadband device 136 (e.g., a modem) in the premises 103. The broadband signal 123 can have a range between about 5 MHz to about 1675 MHz, which includes the CATV frequency band (C) of the source signal 116 (e.g., about 5 MHz-1002 MHz) and a high frequency band (M) (e.g., the MoCA band) of high-band signal 124 (e.g., about 1125 MHz-1675 MHz). In some embodiments, the broadband path 125 includes a broadband splitter 129, which splits the broadband signal 123 provided downstream from the filter device 117 and feeds it to the broadband ports 113A and 113B. Additionally, in the upstream direction, the broadband splitter 129 can combine broadband signals 123 from the gateway device 135 and/or the broadband device 136 into a composite signal. Notably, the hashed lines of broadband port 113B and broadband device 136 indicate that they are optional. And, as described previously herein, some embodiments of the MoCA entry device 100 may only include a single broadband port 113A for connection to a single broadband device, which may be the gateway device 135 that networks with high-band devices 137 in the premises 103 (e.g., in a MoCA network).

The broadband splitter 129 can be ferrite, resistive, or transmission line splitter. In accordance with aspects of the present disclosure, the broadband splitter 129 is configured to operate only at frequencies at and below about 1675 MHz by, for example, using components (e.g., resistors, capacitors, inductors) that minimize noise, reflection, power loss, leakage, etc. over the frequency range of the broadband path 125. In some embodiments, the broadband path 125 lacks any splitter, such as broadband splitter 129. Instead, a single broadband downstream port 113A connects directly to the filter device 117 via transmission lines without any intervening splitter, combiner directional coupler, or similar component. In such embodiments, the transmission lines can be optimized to operate at frequencies at and below about 1675 MHz.

The high-band path 127 connects the broadband downstream ports 113 to the high-band ports 115, and bidirectionally communicates high-band signals 124 having a high frequency band (M) (e.g., MoCA band signals) from the gateway device 135 and/or the broadband device 136 to one or more high-band devices 137 (e.g., MoCA devices) in the premises 103, and vice versa. The high-band path 127 includes high-band splitter 131, which a one or more devices configured to receive the high-band signal 124 (e.g., a high-band component of the broadband signal 123) from the filter device 117 (e.g., high-band filter 121) as an input, split such signal, and output it to the high-band ports 115. In the reverse direction, the high-band splitter 131 is configured to receive a number of high-band signals 124 as inputs to a two or more terminals, combine such signals into a composite high-band signal 124, and output the composite high-band signal 124 to the filter device 117.

The high-band splitter 131 can include one or more ferrite, resistive, or transmission line splitters. In accordance with aspects of the present disclosure, components of the high-band splitter 131 can be optimized for the frequencies of the high-band signal 124. Additionally, the high-band splitter 131 operate only at frequencies at or above 1000 MHz using components that minimize noise, reflection, power loss, leakage etc. over the frequency range of the high-band path 127. In some embodiments, the high-band splitter 131 operate only at frequencies at or between 1100 MHZ and 2000 MHz. Additionally, in some embodiments, the components of the high-band splitter 131 are optimized to operate only at frequencies at or between 1125 MHZ and 1675 MHz Referring now to the signal flow of the MoCA entry device 100 from entry port 111 to the broadband ports 113A and/or 113B, the entry port 111 can receive the source signal 116 from the headend 107 via the entry port 111, which can be connected to the low-band filter 119 of the filter device 117. The low-band filter 119 can pass the source signal 116 to the broadband port 113A via the broadband path 125. In some embodiments, the broadband path 125 includes a broadband splitter 129 the divides the source signal 116 and provides it to broadband ports 113A and 113B, as previously described.

Referring now to the signal flow of the MoCA entry device 100 from the entry port 111 to the downstream high-band ports 115, the entry port 111 can receive a source signal 116 as described above. However, the high-band filter 121 blocks the CATV frequency band (C) of the source signal 116, which prevents the source signal 116 from passing to the downstream high-band ports 115. Rather, the source signal 116 can only flow downstream to the downstream broadband ports 113A and/or 113B.

Referring now to the signal flow of the MoCA entry device 100 from the broadband ports 113A and/or 113B to the entry port 111, the broadband ports 113A and/or 113B can receive the broadband signal 123 from the gateway device 135 and/or the broadband device 136. As described previously herein, the broadband signal 123 can have a range between about 5 MHz to about 1675 MHz, which includes a CATV frequency band (C) component and a high frequency band (M) component. The broadband path 125 receives the broadband signal 123 as an input from broadband ports 113A and/or 113B and provides it to the filter device 117. In some embodiments, the broadband splitter 129 in the broadband path 125 combines the broadband signals 123 received from the gateway device 135 and the broadband device 136. As described previously herein, the low-band filter 119 of the filter device 117 only passes the CATV frequency band (C) of the broadband signal 123 upstream to the entry port 111. Accordingly, the filter device 117 blocks the high frequency band (M) component of the broadband signal 124 from passing to the entry port 111. The filter device 121 permits high frequency band (M) of the broadband 123 to pass to the high-band path 127.

Referring now to the signal flow of the MoCA entry device 100 from the broadband ports 113A and 113B to high-band ports 115, the broadband ports 113A and 113B and the broadband path 125 can receive the broadband signal 123 and pass such signal to the filter device 117 as described previously herein. However, as detailed above, the high-band filter 121 blocks the CATV frequency band (C) component of the broadband signal 123 from passing to the high-band path 127. Instead, in some embodiments, the high-band filter 121 only passes frequencies above the CATV frequency band (C). for example, the high-band filter 121 may only pass the high frequency band (M) to the high-band path 127 and rejects all frequencies outside such band. In some other embodiments, the filter device 117 does not include the high-band filter, and the CATV frequency band (C) is substantially or entirely rejected by frequency-selective components (e.g., transmission lines and splitters) of the high-band splitter 131. Accordingly, the filter device 117 blocks the CATV frequency band (C) component of the broadband signal 123 from passing to the high-band path 127.

Referring now to the signal flow of the MoCA entry device 100 from the broadband ports 115, the high-band ports 115 can receive one or more high-band signals 124 having a high frequency band (M) from one or more high-band devices 137. The high-band path 127 includes a high-band splitter 129 having a two or more terminals respectively connected to the two or more high-band ports 115. The high-band splitter 131 combines the high-band signals 124 into a combined signal, which the high-band splitter provides as an input to the filter device 117. As described previously herein, the filter device 117 passes the high frequency band (M) of the high-band signals to the broadband path 125, and blocks the high frequency band (M) from passing to the entry port 111. In embodiments, the high-band filter 121 of the filter device 117 passes the high frequency band (M) of the high-band signals to the broadband path 125, and the low-band filter 119 of the filter device 117 rejects the high frequency band (M). The broadband path 125 then passes the high-band signal 124 to the broadband ports 113A and/or 113B. Accordingly, the gateway device 135, the broadband device 136, and the high-band devices 137 can bidirectionally communicate via the high frequency band (M) to form, for example, a MoCA network. However, the low-band filter 119 prevents such signals for being communicated from the entry port 111, which prevents leakage of subscriber information from the MoCA network from the premises 103 via the entry port 111.

As set forth in detail above, the MoCA entry device 100 is configured such that the high-band filter 121 and/or high-band splitter 131 in the high-band path 127 substantially block signals outside the high frequency band (M) of the high-band signals 124 (e.g., about 1125 MHz-1675 MHz). As such, embodiments of the MoCA entry device 100 disclosed herein optimize the high-band path 127 for the particular, limited frequency band of the high-band signals 124. Additionally, the high-band splitter 131 and/or the high-band path 127 operate only at frequencies at or above 1000 MHz using components that minimize noise, reflection, power loss, leakage etc. over the high frequency band (M) of the high-band signals 124.

Figure 1A:
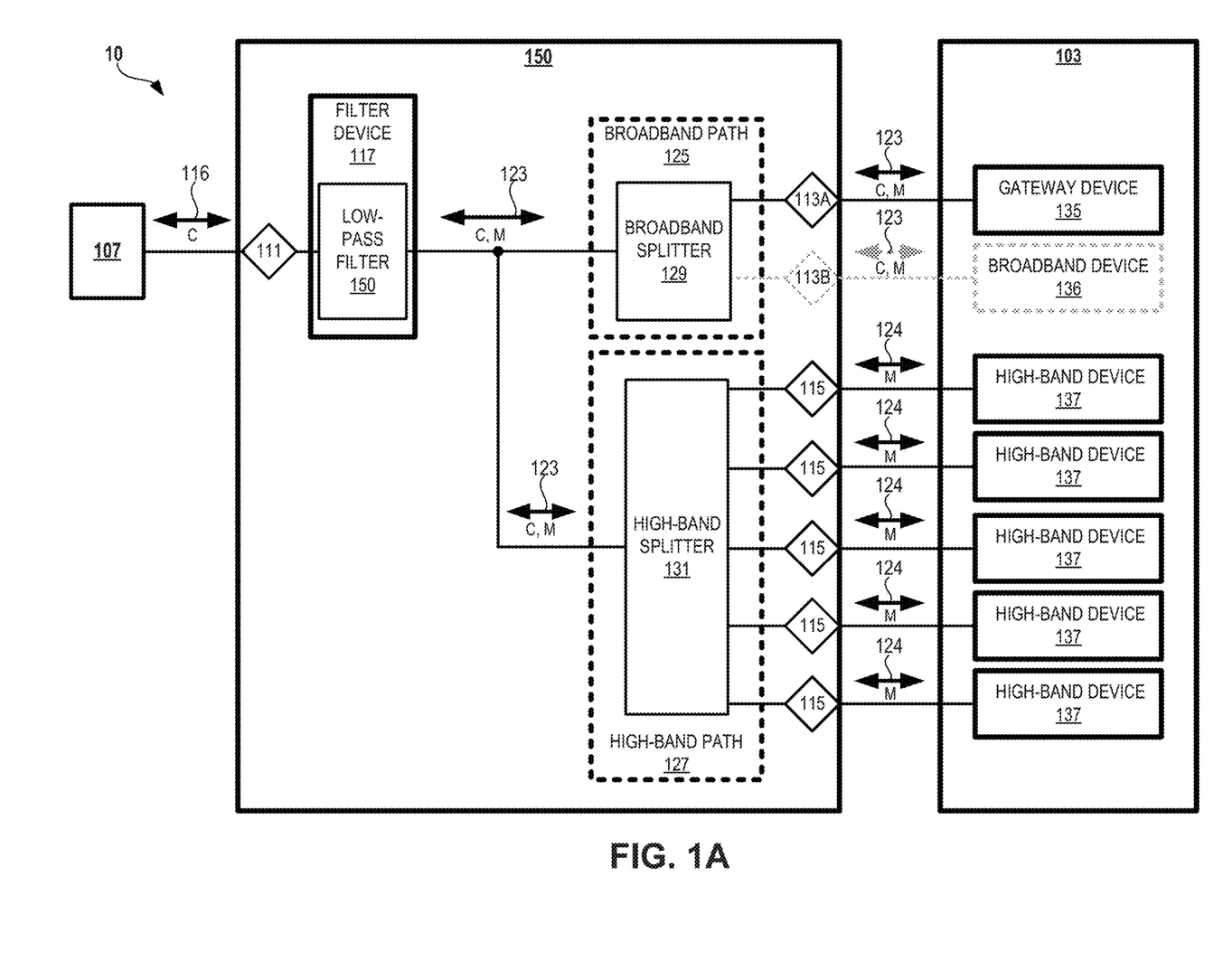
FIG. 1A shows a block diagram illustrating an example of an environment for a MoCA entry device in accordance with aspects of the present disclosure.

FIG. 1A shows a block diagram illustrating an example environment 10 in accordance with aspects of the present disclosure. The environment 10 includes a MoCA entry device 150, a premises 103, and a headend 107, which can be same or similar to those previously described. As also, previously described, the MoCA entry device 150 can be installed between the premises 103 (e.g., a home or business of a CATV subscriber) and a cable (e.g., COAX cable) connecting the headend 107 (e.g., an infrastructure of a CATV service that provides high-definition multimedia content and broadband Internet service).

The MoCA entry device 150 includes an entry port 111, one or more broadband ports 113A and 113B (e.g., CATV ports), and a multiplicity of high-band ports 115 (e.g., MoCA ports), a filter device 117, a broadband path 125, a high-band path 127, a broadband splitter 129, and a high-band splitter 131 (such as a Wilkinson Splitter). These elements and the signal flows among them can be the same or similar to those previously described. Differently from the previous example shown in FIG. 1, the filter device 117 can include a low-pass filter (rather than low-band filter 119 and high-band filter 121) that connects the entry port 111 to the broadband path 125 and the high-band path 127. In accordance with some embodiments, the filter device 117 receives the source signal 116 having the CATV frequency band (C) from the entry port 111 and passes it to the broadband path 125 and the high-band path. The low-pass filter 150 that bidirectionally passes signals having the CATV frequency band (C) and rejects any frequencies greater than the CATV frequency band (C). Accordingly, in the reverse direction, the filter device 117 rejects the high frequency band (M) of the high-band signal 124, included in the broadband signal 123. Doing so prevents leakage of subscriber information from the premises 103 via the entry port 111, as previously described.

Additionally, in accordance with some embodiments, the high-band path 127 connects the broadband downstream ports 113 to the high-band ports 115, and bidirectionally communicates high-band signals 124 having a high frequency band (M) (e.g., MoCA band signals) from the gateway device 135 and/or the broadband device 136 to one or more high-band devices 137 (e.g., MoCA devices) in the premises 103, and vice versa. The high-band path 127 includes high-band splitter 131. The high-band splitter 131 can include one or more devices that receive a broadband signal 123, including the source signal 116 from the filter device 117 and high-band signals 124 from the gateway device 135, the broadband device 136, and/or the high-band devices 137. In accordance with some embodiments, the high-band splitter 131 is constructed using one or more components (e.g., transmission lines and/or splitters) optimized to pass the high frequency band (M) of the high-band signals 124, while rejecting the frequency band (C) of source signal 116. For example, the high-band splitter 131 may operate only at frequencies using components that minimize noise, reflection, power loss, leakage etc. over the frequency range of the high-band path 127. In some embodiments, the high-band splitter 131 operates only at frequencies at or between 1100 MHZ and 2000 MHz. Additionally, in some embodiments, the high-band splitter 131 operate only at frequencies at or between 1125 MHZ and 1675 MHz. Accordingly, the high-band splitter 131 passes only the high-band portion (M) of the broadband signal 123 to the high-band devices 137 via the high-band ports 115. In the reverse direction, the high-band splitter 131 is configured to receive a number of high-band signals 124 as inputs to a two or more terminals, combine such signals into a composite high-band signal 124, and output the composite high-band signal 124 to the filter device 117 and the broadband path 125.

Figure 2:
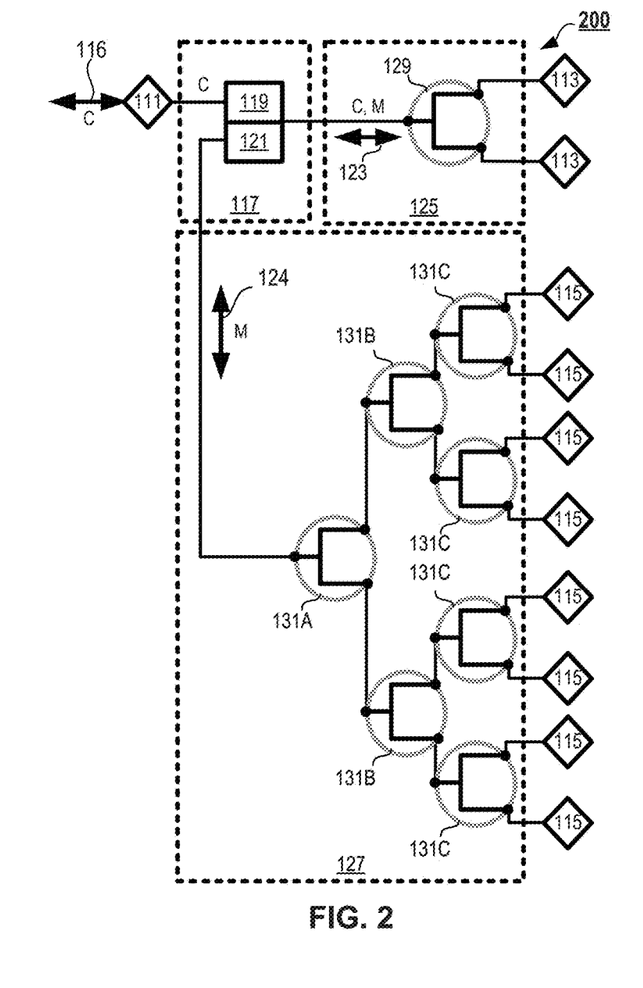
FIG. 2 shows a block diagram of an example of a MoCA entry device in accordance with aspects of the present disclosure.

FIG. 2 shows an example of a MoCA entry device 200 in accordance with aspects of the present disclosure. The MoCA entry device 200 includes entry port 111, broadband downstream ports 113, high-band ports 115, filter device 117, low-band filter 119, high-band filter 121, broadband path 125, high-band path 127, broadband splitter 129, and high-band splitter 131, which can be the same or similar to those previously described herein. The low-band filter 119 passes a broadband signal 123 by filtering a source signal 116 received from the entry port 111, as previously described herein, and outputs the broadband signal 123 to the broadband splitter 129. In accordance with aspects of the present disclosure, the broadband splitter 129 can be one-input, two-output splitter optimized for an operational frequency range below 1675 MHz.

The high-band filter 121 passes a high-band signal 124 (e.g., a MoCA signal) from one or more broadband devices (e.g., gateway device 135) connected via the broadband downstream ports 113, as previously described herein, to multiple (e.g., two or more) high-band ports 115 through a network of one-input, two-output splitters 131A, 131B, and 131C (collectively referred to herein as splitters 131). For example, as shown in FIG. 2, a first high-band splitter 131A can feed two high-band splitter 131B, which can each feed two more high-band splitter 131C, to output the high-band signal 124 to each of eight high-band ports 115. In accordance with aspects of the present disclosure, the high-band splitter 131 can be configured for an operational frequency range only above 1125 MHz. And, in embodiments each of the high-band splitter 131 can have a narrow operational frequency band between about 1125 MHz and about 1675 MHz. Because each of the high-band splitter 131 only operate over such frequencies, the margin of tolerance and/or accuracy of the high-band splitter 131 minimizes error accumulation over the network of high-band splitter 131. Notably, the number of high-band splitter 131 illustrated in FIG. 2 is limited to eight for the sake of illustration. However, it is understood that the number of high-band ports 115 and splitters 131 can be increased or decreased in implementations consistent with the present disclosure. For example, in embodiments, the high-band splitter 131A can feed two high-band splitter 131B to provide four outputs to each of four MoCA ports 115.

Figure 3:
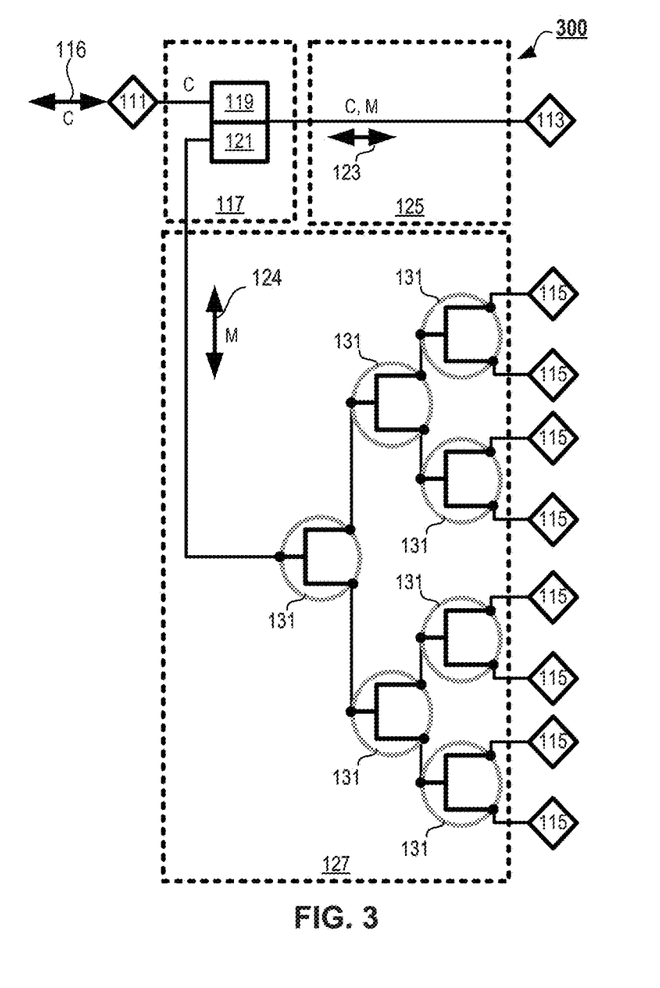
FIG. 3 shows a block diagram of an example of a MoCA entry device in accordance with aspects of the present disclosure.

FIG. 3 shows an example of a MoCA entry device 300 in accordance with aspects of the present disclosure. The MoCA entry device 300, can include entry port 111, a single broadband port 113, multiple high-band ports 115, filter device 117, low-band filter 119, high-band filter 121, broadband path 125 high-band path 127, and high-band splitter 131, which can be the same or similar to those previously described herein. Differently from the previous embodiments, the broadband path 125 lacks any broadband splitter (e.g., broadband splitter 129). Rather, the low-band filter 119 directly connects to the single broadband port 119 via the broadband path 125, which feeds the broadband signal 123 to single broadband device (e.g., a gateway device 135). Thus, in accordance with aspects of the present disclosure, the broadband path 125 is simplified by reducing components (e.g., CATV band splitters), which also reduces cost and complexity of the MoCA entry device 300. Further, because the broadband path 125 lacks any splitter, the MoCA entry device 300 minimizes attenuation of the source signal 116 and the broadband downstream signal 123.

Figure 4:
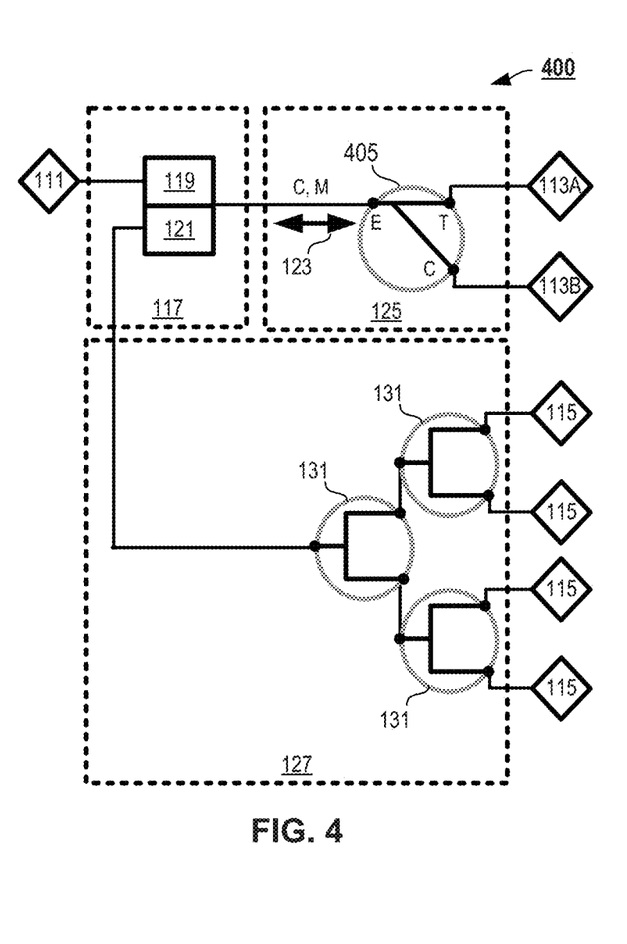
FIG. 4 shows a block diagram of an example of a MoCA entry device in accordance with aspects of the present disclosure.

FIG. 4 shows an example of a MoCA entry device 400 in accordance with aspects of the present disclosure. The MoCA entry device 400 includes entry port 111, broadband ports 113, high-band ports 115, filter device 117, low-band filter 119, high-band filter 121, broadband path 125, a high-band path 127, and high-band splitter 131, which can be the same or similar to those previously described herein. Differently, the broadband path 125 includes a directional coupler 405 including an input port (E) connected to the filter device 117, a through port (T) connected to broadband port 113A, and a coupled port (C) connected to broadband port 113B. The input port (E) passes a majority of the power of broadband signal 123 to broadband port 113A. For example, the directional coupler 405 can attenuate the broadband signal 123 by less than one decibel (dB) between the input port (E) and the through port (T). In comparison, the directional coupler 405 can attenuate the broadband signal 123 provided to the broadband port 113B by over 6 dB between the input port (E) and the coupled port (C). In accordance with aspects of the present disclosure, the directional coupler 405 allows connection to a telephone device (e.g., a voice-over-internet protocol (VOIP) device) connected to broadband port 113B that is unaffected by reflections from an active device (e.g., a gateway device) that may be connected to broadband port 113A. Additionally, the directional coupler 405 can allow the telephone device connected to broadband port 113B to communicate in situations when power to a subscriber residence is lost.

Figure 5:
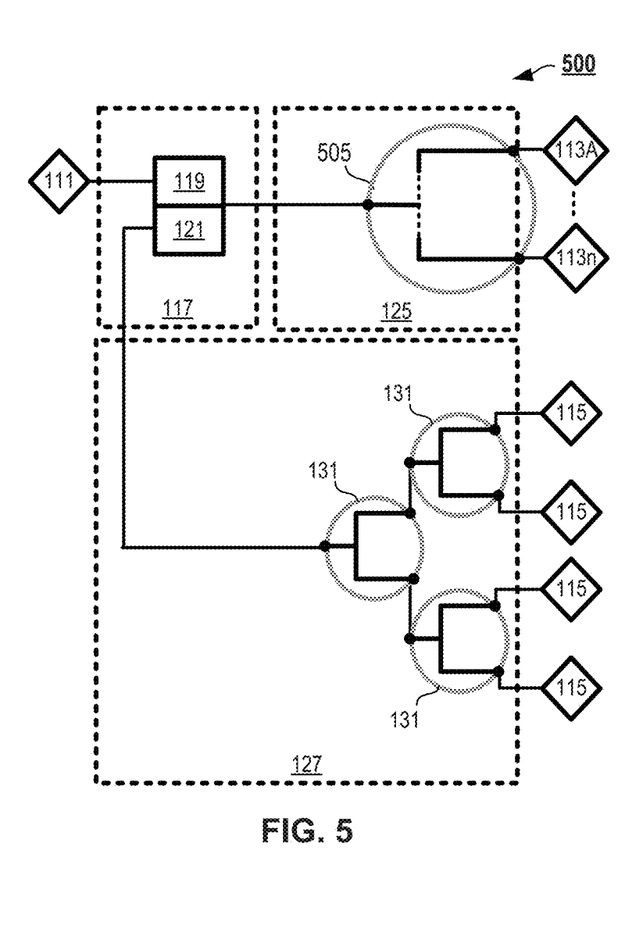
FIG. 5 shows a block diagram of an example of a MoCA entry device in accordance with aspects of the present disclosure.

FIG. 5 shows an example of a MoCA entry device 500 in accordance with aspects of the present disclosure. The MoCA entry device 500 includes entry port 111, broadband downstream ports 113A . . . 113n, high-band ports 115, filter device 117, low-band filter 119, high-band filter 121, broadband path 125, high-band path 127, and high-band splitter 131, which can be the same or similar to those previously described herein. Differently, the broadband path 125 includes a one-to-n broadband splitter 505 having n terminal respectively connected to broadband ports 113A . . . 113n, wherein n can be any integer value greater than two (2).

Thus, in accordance with aspects of the present disclosure, the broadband path 125 can be customized to connect to any number of broadband devices (e.g., gateway device 135 and or broadband device 136) in a subscriber premises.

Figure 6:
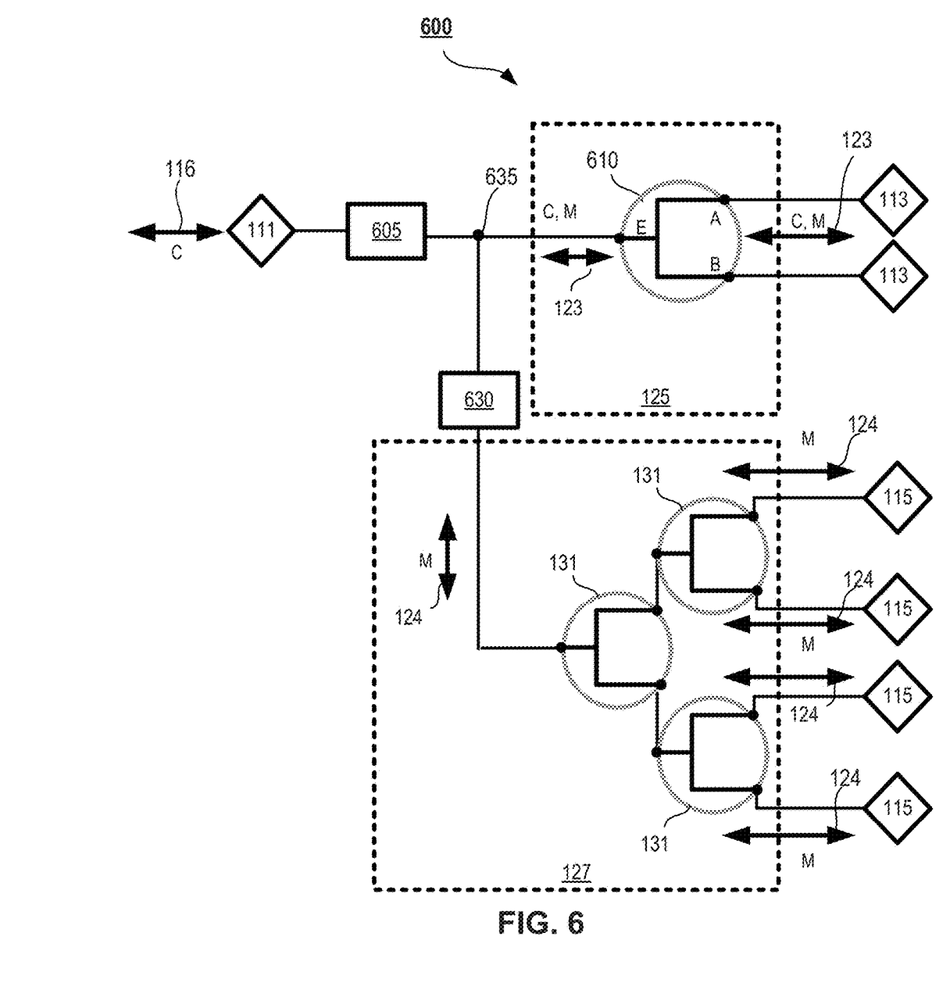
FIG. 6 shows a block diagram of an example of a MoCA entry device in accordance with aspects of the present disclosure.

FIG. 6 shows an example of a MoCA entry device 600 in accordance with aspects of the present disclosure. The MoCA entry device 600 can include entry port 111, broadband ports 113, high-band ports 115, broadband path 125, and high-band path 127, which can be similar to those previously described herein. Different from embodiments previously described herein, the MoCA entry device 600 includes an isolation filter 605 and a reflection filter 630, that can be separated (e.g., distributed) in the MoCA entry device 600, rather than combined in a single filter device (e.g., filter device 117). The isolation filter 605 rejects the high frequency band (M) so as to prevent leakage of high-band signals 124 from the entry port 111. Thus, the isolation filter 605 can provide point of entry isolation, while allowing source signal 116 to pass to a splitter 610 in the broadband path 125. In some embodiments, the isolation filter 605 is a low pass filter that only passes frequencies below 1100 MHz. In other embodiments, the isolation filter 605 only passes frequencies below 1000 MHz, such as low-band frequency (C). The reflection filter 630 can be a filter device that may include high pass and low pass elements, as detailed below.

In implementations, the reflection filter 630 can balance power between the broadband ports 113 and the high-band ports 115 by reflecting a portion of the power of high-band signals 124 in the high-band path 127 back to the high-band ports 115. In some implementations, the reflection filter 630 rejects the low frequency band (C) (e.g., CATV frequency bands) using a combination of high pass filtering and the low frequency filtering inherently provided by high band splitters and transmission lines. Additionally, the reflection filter 630 can throttle the power of the high-band signal 124. Doing so allows the reflection filter 630 to decrease the power of the high-band signal 124 transmitted from the high-band path 127 to the broadband path 123, while increasing power at all of the high-band ports 115 in the high-band path 127.

In accordance with aspects of the present disclosure, the entry port 111 can provide the source signal 116 having a frequency band (C) to the isolation filter 605. After passing through the isolation filter 605, the source signal 116 is split between the broadband bath 125 and the high-band path 127 at circuit node 635. In the broadband path 125, a splitter device 610 connects the isolation filter 605 of the filter device 117 (and the reflection filter 630 of the high band path) to the broadband ports 113. The splitter device 610 includes terminal (E), terminal (A), and terminal (B). The terminal (E) receives the source signal 116 having CATV frequency band (C) as an input from the isolation filter 605 and the high-frequency band (M) as an input from the hybrid filter 630. The splitter 610 splits the source signal 116 and outputs such signal via terminal (A) and terminal (B), which connect to the broadband ports 113.

In the reverse direction from the broadband ports 113, one or more of the terminals (A or B) of the splitter device 610 receives the broadband signal 123 having frequency bands (C) and (M) as an input from the broadband ports 113 and 113. The low-band signal (C) portion of the broadband signal 123 can pass through isolation filter 605 to the entry port 111, whereas the isolation filter blocks the high-band (M) portion from passing to the entry port 111. Additionally, at circuit node 635, the broadband signal 123 can flow to the high-band path 127 via the reflection filter 630, which allows the high-frequency band (M) to pass to the high-band ports 115. Accordingly, a broadband device (e.g., gateway device 135 or broadband device 136) connected to broadband port 113 can bidirectional communicate with high-band devices (e.g., high-band devices 137) connected to the high-band port 115 and to a source connected to entry port 111 via the splitter device 610.

In the direction from the high-band ports 115, one or more of the high-band ports 115 can receive the high band signals 124. The high-band signals 124 can be shared among the high-band ports 115 via splitters 131. Additionally, the high-band signal 124 can be communicated to the circuit node 635 via the reflective filter 630. As described previously, the high-band signal 124 can be communicated to the broadband ports 113 via the splitter 620, whereas they are blocked from the entry port 111 by the isolation filter 605. Further, as described above, the reflection filter 630 can throttle the amount of power of the high-band signal 127 exiting the high-band path 127 so as to increase the signal power of the signal communicated among the high-band ports.

Figure 6A:
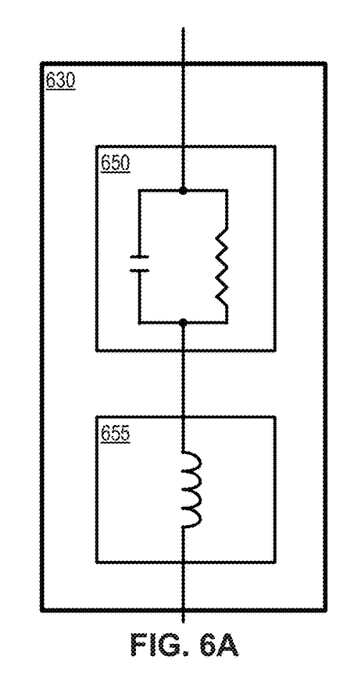
FIG. 6A shows a block diagram of an example of a reflection filter in accordance with aspects of the present disclosure.

FIG. 6A shows a block diagram of an example of a reflection filter 630 in accordance with aspects of the present disclosure. The reflection filter 630 can include a high-pass filter 650 and a low-pass filter 655 that filter low-band frequencies (e.g., low band frequency (C). The high-pass filter 650 can be a resistive-captive-type high-pass filter and the low-pass filter 655 can be an inductive-type low-pass filter. In some embodiments, the low-pass filter 655 can be a high-band reflector (or low pass element) that throttles the signal strength of the high-band signal 124 to attenuate a high-band signal 124 bidirectionally passing through the reflection filter 630. Doing so allows the reflection filter 630 to decrease the power of the high-band signal 124 transmitted from the high-band path 127 to the broadband path 123, while increasing power at all of the high-band ports 115 in the high-band path 127. For example, because the path between the high-band path 127 to the broadband path 123 is low loss (e.g., 6 dB) and the loss between adjacent high-band ports 115 is high (e.g., 25 dB), the low-pass filter 655 can reflect the high-band signal 124 flowing to the broadband path 123 and, instead, distribute its power among the high-band ports, thereby increasing signal strength at the high-band parts 115.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. The present disclosure is not to be limited in terms of the particular embodiments described in this application, which are intended as illustrations of various aspects. Many modifications and variations can be made without departing from its spirit and scope, as will be apparent to those skilled in the art. Functionally equivalent apparatuses within the scope of the disclosure, in addition to those enumerated herein will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

What is claimed is:

1. An entry device, comprising:
    an entry port configured to receive cable television (CATV) signals from a headend;
    a low-band filter connected to the entry port and configured to pass the CATV signals therethrough and to prevent at least a portion of multimedia over coax alliance (MoCA) signals from passing therethrough;
    a high-band filter connected to the low-band filter and configured to pass the MoCA signals therethrough and to prevent at least a portion of the CATV signals from passing therethrough;
    a broadband splitter connected to the low-band filter and the high-band filter;
    a high-band splitter connected to the high-band filter;
    a plurality of first output ports connected to the broadband splitter;
    a plurality of second output ports connected to the high-band splitter;
    wherein a first path extends from the entry port, through the low-band filter and the broadband splitter, to the first output ports;
    wherein the first path is configured to pass the CATV signals therethrough and to prevent at least a portion of MoCA signals from passing therethrough;
    wherein a second path extends from the entry port, through the low-band filter, the high-band filter, and the high-band splitter, to the second output ports;
    wherein the second path is configured to prevent at least a portion of the CATV signals and at least a portion of the MoCA signals from passing therethrough;
    wherein a third path extends from the first output ports, through the broadband splitter, the high-band filter, and the high-band splitter, to the second output ports;
    wherein the third path is configured to pass the MoCA signals therethrough and to prevent at least a portion of the CATV signals from passing therethrough; and
    wherein the first output ports, the second output ports, or both are configured to be connected to one or more devices in a subscriber premises.

2. The entry device of claim 1, wherein the entry port is configured to be connected between the headend and the subscriber premises.

3. The entry device of claim 1, wherein the high-band splitter is configured to operate at frequencies between 1100 MHz and 2000 MHz.

4. The entry device of claim 3, wherein the high-band splitter is not configured to operate at frequencies below 1100 MHz and above 2000 MHz.

5. The entry device of claim 1, further comprising a directional coupler connected to the first output ports, wherein the directional coupler is configured to attenuate the CATV signals by more than 6 dB.

6. An entry device, comprising:
    an entry port configured to receive cable television (CATV) signals from a headend;
    a filter connected to the entry port;
    a plurality of first output ports;
    a plurality of second output ports;
    a first path from the entry port, through the filter, to the first output ports;
    a second path from the entry port, through the filter, to the second output ports;
    a third path from the first output ports, through the filter, to the second output ports;

wherein the first path is configured to pass CATV signals therethrough and to prevent at least a portion of multimedia over coax alliance (MoCA) signals from passing therethrough;

wherein the second path is configured to prevent at least a portion of the CATV signals and at least a portion of the MoCA signals from passing therethrough;

wherein the third path is configured to pass the MoCA signals therethrough and to prevent at least a portion of the CATV signals from passing therethrough; and wherein the first output ports, the second output ports, or both are configured to be connected to one or more devices in a subscriber premises.

7. The entry device of claim 6, wherein the entry port is configured to be connected to the headend.

8. The entry device of claim 6, further comprising a high-band splitter connected to the filter and the second output ports, wherein the high-band splitter is configured to operate at frequencies between 1100 MHz and 2000 MHz.

9. The entry device of claim 8, wherein the high-band splitter is not configured to operate at frequencies below 1100 MHz and above 2000 MHz.

10. The entry device of claim 6, wherein the filter comprises:
a low-band filter configured to pass the CATV signals therethrough and to prevent at least a portion of the MoCA signals from passing therethrough; and
a high-band filter configured to pass the MoCA signals therethrough and to prevent at least a portion of the CATV signals from passing therethrough.

11. The entry device of claim 6, further comprising a broadband splitter in the first path and the third path but not in the second path, wherein the broadband splitter is configured to operate at frequencies at or below 1675 MHz.

12. The entry device of claim 6, wherein the broadband splitter is not configured to operate at frequencies above 1675 MHz.

13. An entry device, comprising:
an entry port configured to receive cable television (CATV) signals from a headend;
a filter connected to the entry port;
a plurality of first output ports;
a plurality of second output ports;
a first path from the entry port, through the filter, to the first output ports;
a second path from the entry port, through the filter, to the second output ports;
a third path from the first output ports to the second output ports;
wherein the first path is configured to pass CATV signals therethrough and to prevent at least a portion of multimedia over coax alliance (MoCA) signals from passing therethrough
wherein the second path is configured to prevent at least a portion of the CATV signals and at least a portion of the MoCA signals from passing therethrough;
wherein the third path is configured to pass the MoCA signals therethrough and to prevent at least a portion of the CATV signals from passing therethrough; and
wherein the first output ports, the second output ports, or both are configured to be connected to one or more devices in a subscriber premises.

14. The entry device of claim 13, wherein the entry port is configured to be connected to the headend.

15. The entry device of claim 13, wherein the entry device is configured to be installed between the headend and the subscriber premises.

16. The entry device of claim 13, further comprising a high-band splitter connected to the filter and the second output ports, wherein the high-band splitter is configured to only pass the MoCA signals therethrough.

17. The entry device of claim 16, wherein the high-band splitter is configured to prevent the CATV signals from passing therethrough.

18. The entry device of claim 13, further comprising a high-band splitter connected to the filter and the second output ports, wherein the high-band splitter is configured to operate at frequencies between 1100 MHz and 2000 MHz.

19. The entry device of claim 18, wherein the high-band splitter is not configured to operate at frequencies below 1100 MHz and above 2000 MHz.

20. The entry device of claim 13, further comprising a broadband splitter in the first path and the third path but not in the second path, wherein the broadband splitter is configured to operate only at frequencies at or below 1675 MHz.

21. An entry device, comprising:
an entry port;
a low-band filter connected to the entry port and configured to pass cable television (CATV) signals therethrough and to prevent at least a portion of multimedia over coax alliance (MoCA) signals from passing therethrough;
a high-band filter connected to the low-band filter and configured to pass the MoCA signals therethrough and to prevent at least a portion of the CATV signals from passing therethrough;
a broadband splitter connected to the low-band filter and the high-band filter, wherein the broadband splitter is configured to operate at frequencies at or below 1675 MHz, and wherein the broadband splitter is not configured to operate at frequencies above 1675 MHz;
a high-band splitter connected to the high-band filter, wherein the high-band splitter is configured to operate at frequencies between 1100 MHz and 2000 MHz, and wherein the high-band splitter is not configured to operate at frequencies below 1100 MHz and above 2000 MHz;
a plurality of first output ports connected to the broadband splitter;
a plurality of second output ports connected to the high-band splitter;
wherein a first path extends from the entry port, through the low-band filter and the broadband splitter, to the first output ports;
wherein the first path is configured to pass the CATV signals therethrough and to prevent at least a portion of MoCA signals from passing therethrough;
wherein a second path extends from the entry port, through the low-band filter, the high-band filter, and the high-band splitter, to the second output ports;
wherein the second path is configured to prevent at least a portion of the CATV signals and at least a portion of the MoCA signals from passing therethrough;
wherein a third path extends from the first output ports, through the broadband splitter, the high-band filter, and the high-band splitter, to the second output ports; and
wherein the third path is configured to pass the MoCA signals therethrough and to prevent at least a portion of the CATV signals from passing therethrough.

22. The entry device of claim 21, wherein the high-band filter is configured to balance a power between the first output ports and the second output ports by reflecting a portion of the power of the MoCA signals from the second output ports back to the second output ports.

23. The entry device of claim 21, wherein the first and second paths are configured to transmit the MoCA signals therebetween.

24. The entry device of claim 23, wherein the high-band filter is configured to throttle a power of the MoCA signals, so as to allow the high-band filter to decrease the power of the MoCA signals transmitted from the second path to the first path, while increasing the power between the second output ports.

25. The entry device of claim 21, further comprising a directional coupler connected to the first output ports, wherein the directional coupler is configured to attenuate the CATV signals by more than 6 dB.

26. An entry device, comprising:
an entry port;
a filter connected to the entry port;
a plurality of first output ports;
a plurality of second output ports;
a first path from the entry port, through the filter, to the first output ports;
a second path from the entry port, through the filter, to the second output ports;
a third path from the first output ports, through the filter, to the second output ports;
a high-band splitter in the second path and the third path but not in the first path;
wherein the first path is configured to pass cable television (CATV) signals therethrough and to prevent at least a portion of multimedia over coax alliance (MoCA) signals from passing therethrough;
wherein the second path is configured to prevent at least a portion of the CATV signals and at least a portion of the MoCA signals from passing therethrough;
wherein the third path is configured to pass the MoCA signals therethrough and to prevent at least a portion of the CATV signals from passing therethrough; and
wherein the high-band splitter is configured to operate at frequencies at or between 1100 MHz and 2000 MHz.

27. The entry device of claim 26, wherein the filter comprises:
a low-band filter configured to pass the CATV signals therethrough and to prevent at least a portion of the MoCA signals from passing therethrough; and
a high-band filter configured to pass the MoCA signals therethrough and to prevent at least a portion of the CATV signals from passing therethrough.

28. The entry device of claim 27, wherein the first path extends through the low-band filter and not through the high-band filter, wherein the second path extends through the low-band filter and the high-band filter, and wherein the third path extends through the high-band filter and not through the low-band filter.

29. The entry device of claim 27, further comprising a broadband splitter in the first path and the third path but not in the second path, wherein the broadband splitter is configured to operate at frequencies at or below 1675 MHz, and wherein the broadband splitter is not configured to operate at frequencies above 1675 MHz.

30. The entry device of claim 29, wherein the CATV signals comprise downstream CATV signals that are received at the entry port from a headend, and wherein the downstream CATV signals pass through the low-band filter and the broadband splitter to the second output ports.

31. The entry device of claim 29, wherein the CATV signals comprise upstream CATV signals that are received at the first output ports, and wherein the upstream CATV signals pass through the broadband splitter and the low-band filter to the entry port.

32. The entry device of claim 29, wherein the high-band splitter is not configured to operate at frequencies below 1100 MHz and above 2000 MHz.

33. The entry device of claim 32, wherein the high-band splitter is configured to pass the MoCA signals through the third path and prevent at least a portion of the CATV signals from passing through the third path.

34. The entry device of claim 32, wherein the MoCA signals comprise upstream MoCA signals that are received at the first output ports, and wherein the upstream MoCA signals pass through the broadband splitter, the high-band filter, and the high-band splitter to the second output ports.

35. The entry device of claim 32, wherein the MoCA signals comprise upstream MoCA signals that are received at the second output ports, and wherein the upstream MoCA signals pass through the high-band splitter, the high-band filter, and the broadband splitter to the first output ports.

36. An entry device, comprising:
an entry port;
a filter connected to the entry port;
a plurality of first output ports;
a plurality of second output ports;
a first path from the entry port, through the filter, to the first output ports;
a second path from the entry port, through the filter, to the second output ports;
a third path from the first output ports to the second output ports;
a high-band splitter in the third path that operates at frequencies between 1100 MHz and 2000 MHz;
wherein the first path is configured to pass cable television (CATV) signals therethrough and to prevent at least a portion of multimedia over coax alliance (MoCA) signals from passing therethrough;
wherein the second path is configured to prevent at least a portion of the CATV signals and at least a portion of the MoCA signals from passing therethrough; and
wherein the third path is configured to pass the MoCA signals therethrough and to prevent at least a portion of the CATV signals from passing therethrough.

37. The entry device of claim 36, wherein the third path does not extend through the filter.

38. The entry device of claim 37, wherein the high-band splitter is configured to pass the MoCA signals through the third path and prevent at least a portion of the CATV signals from passing through the third path.

39. The entry device of claim 38, wherein the high-band splitter is not configured to operate at frequencies below 1100 MHz and above 2000 MHz.

40. The entry device of claim 39, wherein the filter comprises a low-band filter and not a high-band filter.

41. An entry device, comprising:
an entry port;
a low-band filter connected to the entry port and configured to pass cable television (CATV) signals therethrough and to prevent at least a portion of multimedia over coax alliance (MoCA) signals from passing therethrough;
a broadband splitter connected to the low-band filter;
a high-band splitter connected to the low-band filter and the broadband splitter;
a plurality of first output ports connected to the broadband splitter;

a plurality of second output ports connected to the high-band splitter;

wherein a first path extends from the entry port, through the low-band filter and the broadband splitter, to the first output ports;

wherein the first path is configured to pass the CATV signals therethrough and to prevent at least a portion of MoCA signals from passing therethrough;

wherein a second path extends from the entry port, through the low-band filter, and the high-band splitter, to the second output ports;

wherein the second path is configured to prevent at least a portion of the CATV signals and at least a portion of the MoCA signals from passing therethrough;

wherein a third path extends from the first output ports, through the broadband splitter, and the high-band splitter, to the second output ports;

wherein the third path is configured to pass the MoCA signals therethrough and to prevent at least a portion of the CATV signals from passing therethrough; and wherein the entry device does not comprise a high-band filter between the low-band filter and the high-band splitter.

42. The entry device of claim 41, wherein the entry device does not comprise the high-band filter between the broadband splitter and the high-band splitter.

43. The entry device of claim 41, wherein the high-band splitter is configured to only operate at frequencies between 1100 MHz and 2000 MHz.

44. The entry device of claim 41, wherein the broadband splitter is configured to only operate at frequencies at or below 1675 MHz.

45. An entry device, comprising:
an entry port;
a filter connected to the entry port;
a plurality of first output ports;
a plurality of second output ports;
a first path from the entry port, through the filter, to the first output ports;
a second path from the entry port, through the filter, to the second output ports;
a third path from the first output ports to the second output ports;
wherein the first path is configured to pass cable television (CATV) signals therethrough and to prevent at least a portion of multimedia over coax alliance (MoCA) signals from passing therethrough;
wherein the second path is configured to prevent at least a portion of the CATV signals and at least a portion of the MoCA signals from passing therethrough;
wherein the third path is configured to pass the MoCA signals therethrough and to prevent at least a portion of the CATV signals from passing therethrough; and
wherein the third path does not extend through the filter.

46. The entry device of claim 45, further comprising a high-band splitter connected to the filter and the second output ports, wherein the high-band splitter is configured to only operate at frequencies between 1100 MHz and 2000 MHz.

47. The entry device of claim 46, wherein the entry device does not comprise a high-band filter between the filter and the high-band splitter.

48. The entry device of claim 45, further comprising a broadband splitter in the first path and the third path but not in the second path, wherein the broadband splitter is configured to only operate at frequencies at or below 1675 MHz.

49. An entry device, comprising:
an entry port;
a filter connected to the entry port;
a plurality of first output ports;
a plurality of second output ports;
a first path from the entry port, through the filter, to the first output ports;
a second path from the entry port, through the filter, to the second output ports;
a third path from the first output ports to the second output ports;
wherein the first path is configured to pass cable television (CATV) signals therethrough and to prevent at least a portion of multimedia over coax alliance (MoCA) signals from passing therethrough;
wherein the second path is configured to prevent at least a portion of the CATV signals and at least a portion of the MoCA signals from passing therethrough;
wherein the third path is configured to pass the MoCA signals therethrough and to prevent at least a portion of the CATV signals from passing therethrough; and
wherein the third path does not extend through the filter.

50. The entry device of claim 49, wherein the entry device is configured to be installed between a headend and a subscriber premises.

51. The entry device of claim 49, wherein the entry port is configured to connect to a headend, wherein the first output ports, the second output ports, or both are configured to connect to one or more devices at a subscriber premises.

52. The entry device of claim 49, further comprising a high-band splitter connected to the filter and the second output ports, wherein the high-band splitter is configured to only pass the MoCA signals therethrough.

53. The entry device of claim 52, wherein the entry device does not comprise a high-band filter between the filter and the high-band splitter.

* * * * *